(12) United States Patent
Kreyenborg et al.

(10) Patent No.: US 6,422,852 B1
(45) Date of Patent: Jul. 23, 2002

(54) FILTER DEVICE FOR EXTRUDERS AND INJECTION MOULDING MACHINES

(75) Inventors: Jan-Udo Kreyenborg; Rolf-Rüdiger Stude, both of Münster (DE)

(73) Assignee: Kreyenborg Verwaltungen und Beteiligungen GmbH & Co. KG, Munster (DE)

( * ) Notice: Subject to any disclaimer, the term of this patent is extended or adjusted under 35 U.S.C. 154(b) by 0 days.

(21) Appl. No.: 09/673,058

(22) PCT Filed: Mar. 4, 1999

(86) PCT No.: PCT/DE99/01073

§ 371 (c)(1),
(2), (4) Date: Oct. 10, 2000

(87) PCT Pub. No.: WO99/56939

PCT Pub. Date: Nov. 11, 1999

(30) Foreign Application Priority Data

Apr. 30, 1998 (DE) .......................................... 198 19 195
Jul. 30, 1998 (DE) .......................................... 198 34 302

(51) Int. Cl.[7] .............................................. B29C 47/36
(52) U.S. Cl. ....................... 425/197; 210/347; 210/455; 425/199
(58) Field of Search ................................ 425/197, 198, 425/199; 210/236, 340, 341, 455, 447

(56) References Cited

FOREIGN PATENT DOCUMENTS

| DE | 42 18 756 C1 | 4/1993 |
| DE | 295 17 140 U1 | 1/1996 |
| DE | 196 15 679 A1 | 10/1996 |
| DE | 197 30 574 C1 | 4/1998 |
| EP | 0 250 695 A1 | 1/1988 |

*Primary Examiner*—Tim Heitbrink
(74) *Attorney, Agent, or Firm*—Merchant & Gould P.C.

(57) ABSTRACT

A filter device for extruders and injection moulding machines designed to process thermoplastics, comprising filter elements that are fitted in at least two separate ducts of a housing between at least one main admission duct and one main exit duct and are interchangeably mounted in sieve carrier bolts in sieve openings that can be moved inwards and outwards with said sieve carrier bolts in the respective bore hole of the housing. At least one locking mechanism is provided in the vicinity of the main admission duct upstream from the sieve carrier bolts. When in a flow position, the locking mechanism does not impede the flow of plastic from the main admission duct to the filter elements. However, when the locking mechanism is in a locking position, the flow of plastic in a partial admission duct is separated from the main admission duct, whereby a) the filter elements in the sieve carrier bolts are configured in an oval shape in a manner that is known per se, whereby the long axis of the oval extends in the direction of displacement of the sieve carrier bolts and the length of the oval axis of the filter elements in relation to the length of the housing bore hole is selected in such a way that only the length of the sieve carrier bolts required to seal the sieve carrier bolts in the housing bore hole is devoid of filter elements and b) the partial admission ducts for each sieve opening open out into at least two flow ducts.

22 Claims, 3 Drawing Sheets

FILTER DEVICE FOR EXTRUDERS AND INJECTION MOULDING MACHINES

CROSS-REFERENCE TO RELATED APPLICATIONS

Not Applicable

STATEMENT REGARDING FEDERALLY SPONSORED RESEARCH

Not Applicable

REFERENCE TO A "MICROFICHE APPENDIX"

Not Applicable

BACKGROUND OF THE INVENTION

1. Field of the Invention

The invention concerns a filter device for extruders and injection molding machines according to the precharacterizing clause of the main claim.

2. Description of the Related Art

A filter device representing this type is described in DE 42 18 756 C1.

From DE 295 17 140 U1 a filter device has become known in which an oval sieve is inserted into the sieve bolt. With this previously known form of embodiment it is a matter of a sieve exchanger in which the extruder must be turned off during the sieve exchange, so that the seal length between the material duct and the housing outer edge may be smaller than in the case of a continuous sieve exchanger.

BRIEF SUMMARY OF THE INVENTION

The object on which the invention is based is to make available in a filter device of the generic type a large sieve surface that, however, is arranged in a relatively small housing, so that the entire arrangement is not built larger than the filter devices that are usual in the prior art. Achieved through the large sieve surface is a long service life and, furthermore, good filtering results with normal throughput, in comparison to the normal sieves that are usual in the prior art. Thus, an increase in throughput in comparison to normal sieves is aimed at.

This object forming the basis of the invention is accomplished through a filter device for extruders and injection molding machines for processing the plastics, with filter elements exchangeably arranged in at least two separate ducts of a housing between at least one main admission duct and at least one main outlet duct in sieve carrier bolts in sieve openings, which filter elements can be pushed in or pulled out with the sieve carrier bolts arranged in the respective housing bores; in this, in the region of the main admission duct at least one blocking means is arranged in front of the sieve carrier bolts, which blocking means in the flow position does not hinder the stream of plastic moving from the main admission duct to the filter elements, but which in the blocking position separates the flow of the plastic in a partial admission duct from the main admission duct, characterized by the fact that:

a) the filter elements in the sieve carrier bolts are formed as ovals in a manner known per se, the long axis of the oval extending in the direction of the displacement of the sieve carrier bolts and the length of the oval axis of the filter elements with respect to the length of the housing bore in the housing being chosen in such a manner that only the length of the sieve carrier bolts necessary for the sealing of the sieve carrier bolts in the housing bore is free of the filter element, b) and the partial admission ducts each open into a sieve opening in at least two inflow ducts.

Advantageous developments of the invention include but are not limited to the following.

The filter element may include ventilation grooves formed in the sieve carrier bolts and connected with the sieve openings that accommodate the filter elements.

Provision may be made for at least one outflow duct for each sieve opening.

The blocking means may be formed by a bolt that traverses the main admission duct and is adjustable transversely to the flow direction of the plastic stream to be filtered, and the flow path from the main admission duct to the admission ducts may be formed by a narrow section in the outer periphery of the bolt.

A main discharge duct may be present in the bolt, which duct opens at one end into the atmosphere and to which are connected two partial discharge ducts, which upon displacement of the bolt can be brought into a fluid connection with one or the other partial admission duct In the fluid connection of the partial discharge ducts with the associated partial admission ducts, the flow cross-section in the transition region between the partial admission ducts and the partial discharge ducts may be smaller than the flow cross-section of the partial admission ducts.

The blocking means may be arranged in the housing of the sieve exchanger.

The blocking means may be arranged in its own housing, which is attachable to the housing of tee filter device.

The bolt may be round in shape and the narrow section is designed over the entire circumference of the bolt.

The bolt, on its side facing the main admission duct, may displays a bypass duct that, depending on the position of the bolt, is able to produce a connection between the main admission duct and the outside atmosphere.

The opening of the bypass duct into the main admission duct may be arranged so that the main admission duct can be brought into fluid connection with both the narrow section and the bypass, but that through adjustment of the bolt the connection between the main admission duct and the narrow section is closable while the connection between the main admission duct and the bypass duct is open.

The bolt of the blocking means, in addition to its movement in the longitudinal axis, also may be rotatable around the longitudinal axis.

This object forming the basis of the invention is also accomplished through blocking means for controlling the throughput of a flowable medium, with filter elements arranged in at least two separate ducts of a housing between at least one main admission duct and at least one main outlet duct, the blocking means being arranged in the region of the main admission duct in front of the filter elements;

and in the flow-through position not hindering the flow of the flowable medium from the main admission duct to the filter elements, but in a blocking position separating the flow-through of the medium in an admission duct from the main admission duct, characterized by the fact that the blocking means is formed by a bolt, arranged in a housing, which bolt traverses the main admission duct and is adjustable adversely to the flow direction of the flowable medium, and tat the flow path from the main admission duct to an outlet duct is formed by a narrow section in the outer periphery of the bolt.

Advantageous developments of the invention may also include but are not limited to the following.

The narrow section may be designed so as to allow an efficient flow.

The blocking means may include a main discharge duct in the bolt, which duct on one end opens into the atmosphere and connects to two partial discharge ducts, which upon a displacement of the bolt can be brought into fluid connection with one of the partial admission ducts.

During the fluid connection of the partial discharge ducts with the associated partial admission ducts the flow cross-section in the transition region between the partial admission ducts and the partial discharge ducts may be smaller tan the flow cross-section of the partial admission ducts.

The blocking means may be arranged in its own housing, which is attachable to the housing of the filter device.

The blocking means may be arranged in the housing of the sieve exchanger.

The bolt may be round in shape and the narrow section is designed over the entire circumference of the bolt.

The bolt, on its side facing the main admission duct, may display a bypass duct that, depending on the position of the bolt, is able to produce a connection between the main admission duct and the outside atmosphere.

The opening of the bypass duct into the main admission duct may be arranged so that the main admission duct can be brought into fluid connection with both the narrow section and the bypass, but that through adjustment of the bolt the connection between the main admission duct and the narrow section is closable while the connection between the ma admission duct and the bypass duct is open.

The bolt of the blocking means, in addition to its movement in the longitudinal axis, also may be rotatable around the longitudinal axis.

Expressed in different words, it is proposed that the sieve in each sieve carrier bolt is designed so as to be virtually the size, i.e. the length considered in the displacement direction of the sieve carrier bolt, of the actual housing that accommodates the sieve carrier bolts. In this, there arises the difficulty that during the extracting of the sieve, i.e. of the filter element, the latter already comes into contact with the atmosphere in a peripheral region of the filter element, so that a flowing out of the filtered and to-be-filtered plastic occurs. Thus, it must be ensured that, at the moment when the sieve carrier bolt begins its pulling-out movement, the partial admission duct, assigned to this sieve opening, of the main admission duct is closed off. On the other hand, it must be ensured that during the driving in of the sieve carrier bolt to its filtering position a pre-ventilation of the sieve opening can take place, during which the partial admission duct assigned to the other sieve carrier bolt is still loaded with the plastic material to be filtered. By virtue of this blocking position achievable through the blocking means, the possibility of a large, oval sieve design comes about.

With the use of a large, oval sieve, according to the invention it is proposed that the admission ducts in each case open into two inflow ducts, whereas, however, only one outflow duct can be planned for each sieve opening. In this way, favorable inflow and outflow conditions are produced.

The blocking means is preferable designed as a bolt, and this bolt, preferable arranged in an attachment housing, displays a flow opening for the plasticized plastic material, the flow opening being formed by the bolt's having a preferably circumferential narrow section, through which can flow the stream of plastic. This narrow section leads into the mouth of the two partial admission ducts. The bolt is displaceable in a direction transverse to the stream of plastic and displays in addition a main discharge duct and partial discharge ducts, which connect to the main discharge duct.

Through a displacement of the bolt, a position can now be attained in which the admission duct is connected to the partial admission duct via the narrow section designed in the bolt. By means of the controls standard today, this bolt that forms the locking means can be positioned such that, on the one hand, the partial admission duct leading to the sieve opening is completely closed off, and on the other hand the possibility exists, despite the loading of the other partial admission duct, of creating a connection to the other partial admission duct, so that here a pre-flooding of the sieve opening is made possible.

In addition, the bolt designed according to the dependent claims makes it possible that when the bolt assumes a position in which the main admission duct is connected to the partial admission duct via the narrow section designed in the bolt, the other partial admission duct is connected via a partial discharge duct to the main discharge duct, so that the loading of the mold connected to the filter device still takes place, but at the same time the idle sieve can be run through from the clean side of the sieve towards the dirty side of the sieve and the dirt particles removed here flushed back through the partial admission duct assigned to this sieve and then conducted via a partial discharge duct into the main discharge duct. The main discharge duct here leads to the atmosphere.

The bolt designed as a blocking means displays, on its side facing the main admission duct, a bypass duct, which in dependence on the position of the bolt is capable of producing a connection between the main admission duct and the outside atmosphere.

In addition, the invention relates to a blocking means for controlling the throughput of a flowable medium independently of the subsequently connected unit, for example the above described filter device. The blocking means can also be used in conjunction with other flowable media that are to be controlled.

BRIEF DESCRIPTION OF THE DRAWINGS

An example of embodiment of the invention will be explained in the following with the aid of the drawings. The drawings show.

DETAILED DESCRIPTION OF THE INVENTION

Figure 1:
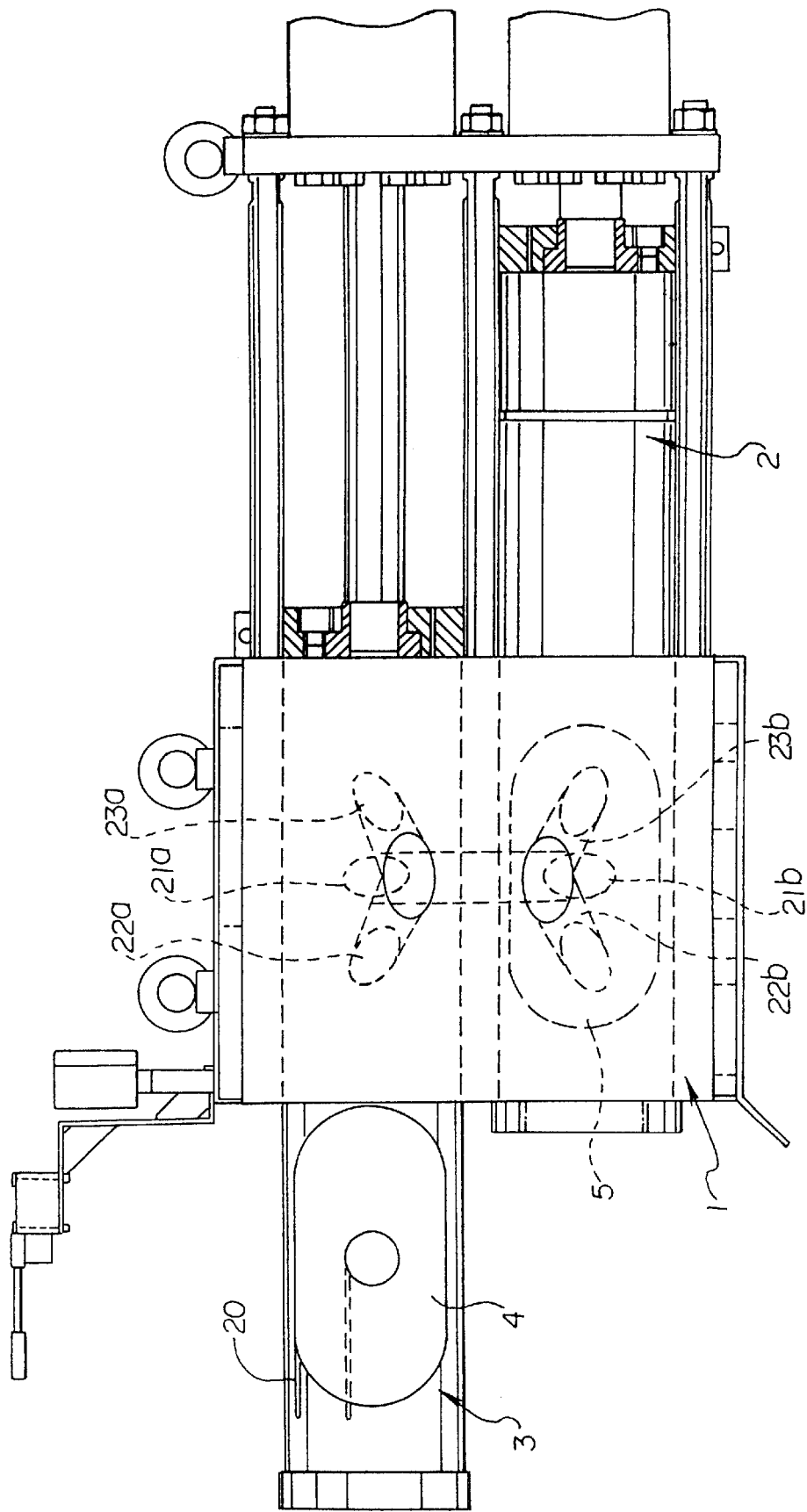
FIG. 1: a filter device with two sieve carrier bolts and, in each case, a large, oval sieve arranged in each sieve carrier bolt

According to FIG. 1, arranged in a housing 1 are two sieve carrier bolts 2 and 3, which in the represented example of embodiment are arranged one above the other. Designed in the sieve carrier bolts 2 and 3 are filter elements 4 and 5, which—as can be clearly seen in the drawing are formed as ovals, the long axis of the oval extending in the direction of the displacement direction of the sieve carrier bolts 2 and 3 and the length of the oval axis of the filter elements 4, 5 relative to the length of the housing bore in the housing 1 is selected in such a manner that only the length of the sieve carrier bolts 2, 3 required for the sealing of the sieve carrier bolts 2, 3 in the housing bore is free of the filter element.

As can be seen from the representation according to FIG. 1, shortly after the beginning of the pushing-out movement of one or the other sieve carrier bolt 2 or 3, the peripheral edge face of the filter element 4 or 5 in question already comes into contact with the outside atmosphere, while the remaining portion of the filter element 4 or 5 is still connected with the conveying of the filtered or to-be-filtered plastic material, so that here a direct connection between the feed stream of the plastic material or the outflowing stream of the plastic material and the outside atmosphere would take place.

The displacement of the sieve carrier bolts 2, 3 takes place in a manner known per se, via hydraulic or electric devices, and is controlled by means of suitable controls, such as are generally customary in the prior art.

In order to prevent this harmful contact between the sieve opening and the outside atmosphere, according to the invention provision is made for a blocking means 10, which in the represented example of embodiment is formed in conjunction with the housing 1 as follows:

The housing 1 displays a main admission duct 6 and a main outlet duct 7; provision can be made in front of the main admission duct 6 for a worm (not represented) by means of which the plasticized plastic material is fed to the main admission duct 6 under appropriately high pressure. Inside the housing 6 the main admission duct 6 divides into two partial admission ducts 8a and 8b, which are connected with sieve openings 28 and 29, respectively, in which are arranged the filter elements 4, 5. Connected to the clean sieve side of the sieve openings 28, 29 are partial outlet ducts 9a and 9b, which lead to a main outlet duct 7.

Designed in front of the actual housing 1 of the filter device is an additional housing, which accommodates the bolt 11 that is formed as a blocking means and displaceable transversely to the current direction of the stream of plastic by hydraulic, pneumatic, or other means. Leading into this housing 24 are, on the one side, extensions of the partial admission ducts 8a and 8b and, on the other, opposite side, the main admission duct 6. Instead of an additional housing, the blocking means can also be arranged inside the housing 1.

The flow connection between the main admission duct 6 and the partial admission ducts 8a and 8b is achieved through a narrow section in the bolt 11, whereby in the represented example of embodiment the bolt 11 is formed as a cylinder, i.e. round in cross-section, and the narrow section 11 is formed on the entire outer circumference of the bolt 11. The apparatus formed by the housing 24 and the bolt 11 as well as the main admission duct 6 will be called the blocking means 10 in the following; the bolt 11 can also be formed as a polygon. The bolt 11 displays further a main discharge duct 16, which in the represented example of embodiment extends centrally when viewed in the longitudinal axis of the bolt 11 and which on one end opens into the atmosphere. Two partial discharge ducts 14 and 15 extend transversely to the longitudinal axis of the main discharge duct 16 and lead on one end into the main discharge duct 16 and on the other end to the outer side of the bolt 11. Of course, other configurations of the main discharge duct or ducts can also be designed.

In addition, the bolt 11 is equipped with a bypass duct 27, which is arranged in such a manner that it can be brought into a flow connection with the main admission duct 6, so that the material coming from the main admission duct 6 is not led to the partial admission ducts 8a or 8b, but rather can be led out into the atmosphere. When the extruder is started, contaminated and chemically cracked molten material is discharged via the bypass duct 27 to the outside and only after this process is the production started.

Figure 2:
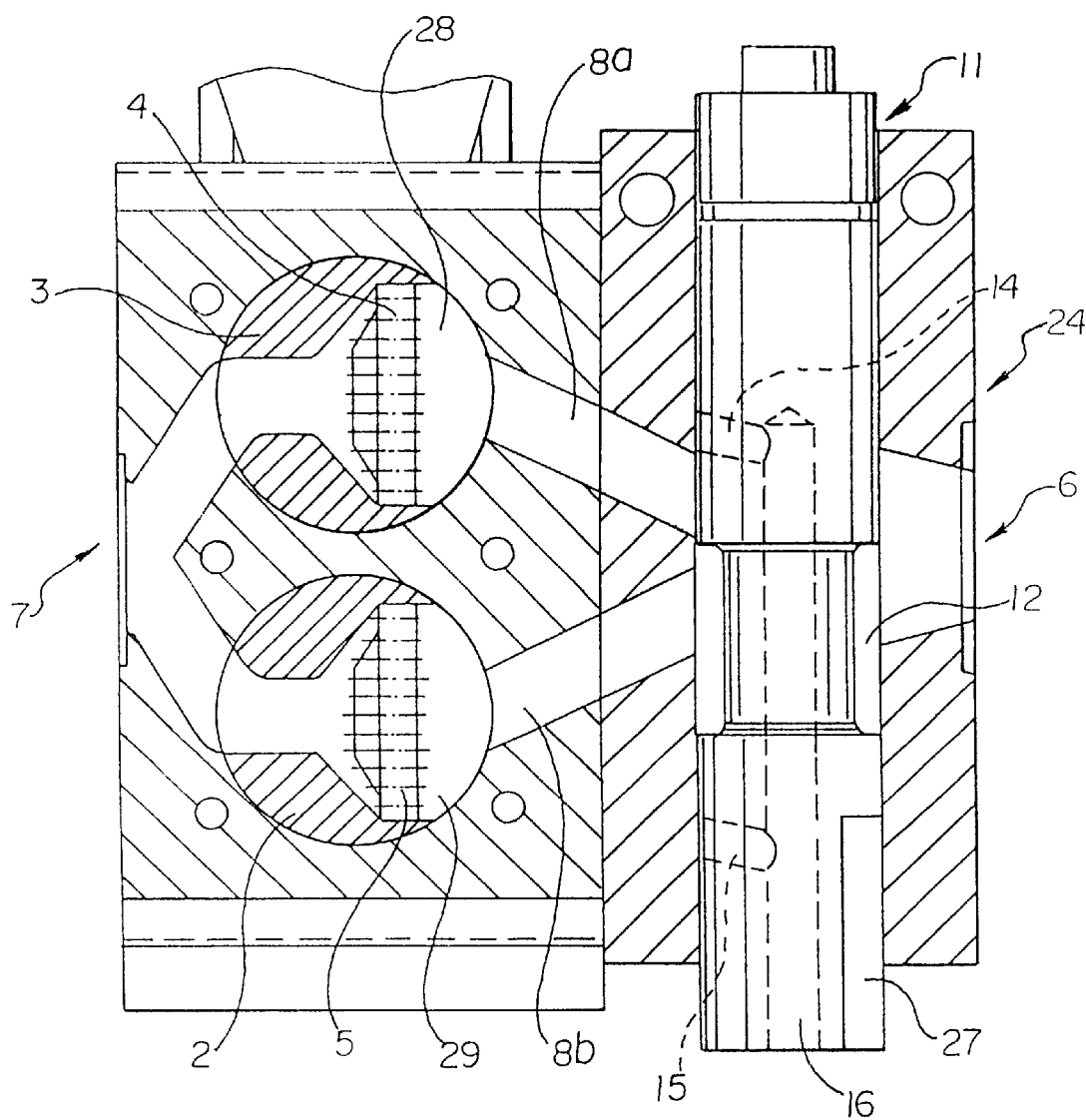
FIG. 2: the blocking position of the above sieve carrier bolt

In the representation according to FIG. 2, the bolt is situated in such a position that the narrow section 12 conducts the stream of plastic material fed through the main admission duct 6 towards the partial admission duct 8b. From here the material reaches the filter element 5.

Figure 3:
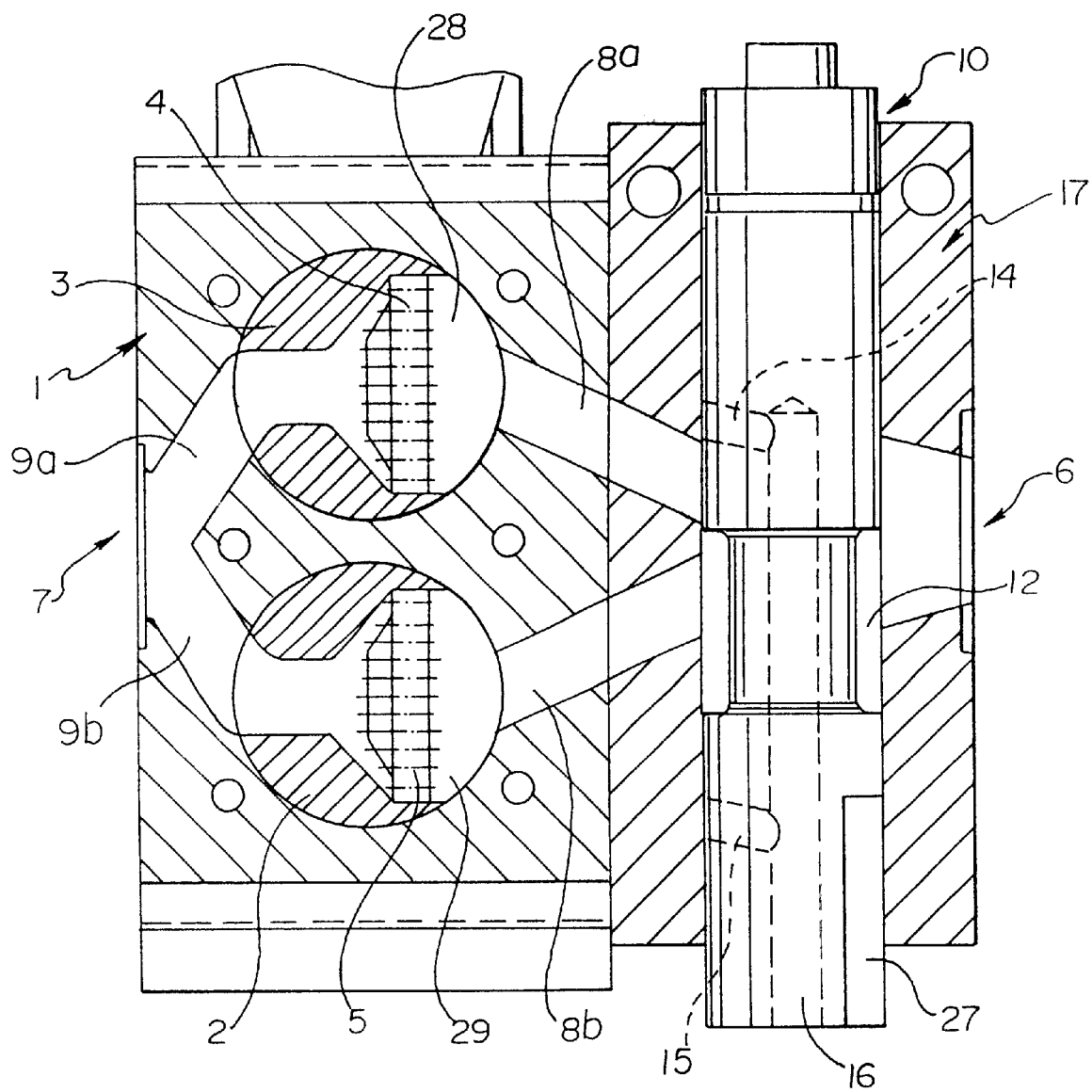
FIG. 3: the pre-flooding position for the sieve opening in the above sieve carrier bolt

FIG. 3 shows that through a slight displacement of the bolt 11 the narrow section 12 can come into contact also with the partial admission duct 8a, so that a pre-flooding of the sieve opening 28 can be carried out.

FIG. 1 further shows that each partial admission duct opens into its associated sieve opening in two inflow ducts 22a, 23a or 22b, 23b, respectively, so that very favorable inflow conditions are attained for the large, oval filter elements 4 and 5. FIG. 1 should also make clear that for each sieve opening 28, 29 only one outflow duct, 21a or 21b, respectively, is provided.

With the filter element 4 or 5 formed according to the invention, a long service life for large sieve surfaces is achieved, as well as good filtering results with normal throughput compared to a normal sieve. An increase in throughput compared to normal sieves is also possible. Also achieved through the use of the above described blocking means 10 is the fact that this blocking means can be used with differently designed extruder arrangements in the simplest manner as a startup valve and for reverse rinsing, so that with such a blocking means the most various tasks can be accomplished in filter devices for extruders and injection molding machines.

The blocking means 10 described above, i.e. the bolt 16 arranged in a housing 17, can also be used to control other flowable media, i.e. it need not strictly be a matter of a stream of plastic that is controlled by it, but rather the advantages of the blocking means 10 described above and placed under protection in the dependent claims can be made use of independently of the medium to be controlled.

What is claimed is:

1. Filter device for extruders and injection molding machines for processing thermoplastics, comprising:

a housing defining therein at least one main admission duct and at least one main outlet duct connected thereto, said housing also defining at least two sieve openings therein between said at least one main admission duct and said at least one main outlet duct;

sieve carrier bolts disposed within said sieve openings, said carrier bolts defining ducts therein, said carrier bolts being displaceable within said sieve openings;

filter elements exchangeably arranged in said ducts in said sieve carrier bolts;

at least one partial admission duct connecting said main admission duct with said filter elements at least one blocking means moveable between a flow position wherein said blocking means does not hinder a flow of plastic moving from said main admission duct to said filter elements and a blocking position wherein said blocking means prevents the flow of plastic from the main admission duct to the at least one partial admission duct, wherein a) said filter elements in said sieve carrier bolts are formed in a shape of an oval, a long axis of the oval extending in a direction of a displacement of said sieve carrier bolts, a length of the long axis of the oval being such that only a length of said sieve carrier bolts necessary for sealing said sieve carrier bolts in said sieve openings is free of said filter elements; and b) each of said at least one partial admission is connected to at least one of said sieve openings with at least two inflow ducts.

2. Filter device according to claim 1, filer comprising ventilation grooves defined in said sieve carrier bolts, said ventilation grooves being connected with said sieve openings.

3. Filter device according to claim 1, further comprising at least one outflow duct for each of said sieve openings.

4. Filter device according to claim 1, wherein said blocking means comprises a bolt that traverses said main admission duct, said bolt being adjustable transversely to a flow direction of the flow of plastic, said bolt comprising a narrow section in an outer periphery of said bolt such that plastic may flow past said bolt at said narrow section.

5. Filter device according to claim 4, further comprising a main discharge duct defined in said bolt, said main discharge duct being open at a first end to atmosphere, said bolt further defining two partial discharge ducts connected with said main discharge duct, wherein said bolt is displaceable such that at least one of said partial discharge ducts can be brought into fluid connection with each of said partial admission ducts.

6. Filter device according to claim 5, wherein a flow cross-section in a transition region between said partial admission ducts and said partial discharge ducts is smaller than a flow cross-section of said partial admission ducts.

7. Filter device according to claim 1, wherein said blocking means is arranged in said housing.

8. Filter device according to claim 1, wherein said blocking means is arranged in a further housing, said further housing being attachable to said housing.

9. Filter device according to claim 4, wherein said bolt is round in shape, and wherein said narrow section extends around an entire circumference of said bolt.

10. Filter device according to claim 4, wherein said bolt defines a bypass duct on a side of said bolt facing said main admission duct, said bolt being moveable to produce a connection between said main admission duct and atmosphere.

11. Filter device according to claim 10, wherein said bypass duct is arranged such that motion of said bolt can bring said main admission duct into fluid connection with both said narrow section and said bypass, and such that motion of said bolt can bring said main admission duct and said bypass duct into fluid connection without bringing said main admission duct and said narrow section into fluid connection.

12. Filter device according to claim 4, wherein said bolt is rotatable around a longitudinal axis thereof.

13. Blocking means for controlling throughput of a flowable medium within a housing, said housing comprising at least one main admission duct and at least one main outlet duct connected thereto, and at least two filter elements in separate ducts therein, said housing further comprising at least one admission duct connecting said filter elements to said main admission duct, said blocking means comprising:
a bolt disposed between said main admission duct and said filter elements, said bolt being movable between a flow position wherein said bolt does not hinder a flow of the flowable medium from said main admission duct to said filter elements and a blocking position wherein said bolt prevents the flow of the flowable medium from the main admission duct to said at least one admission duct,
wherein
said bolt traverses said main admission duct and is adjustable transversely to a flow direction of the flowable medium, and said bolt comprises a narrow section in an outer periphery of said bolt such that the flowable medium may flow past said bolt at said narrow section.

14. Blocking means according to claim 13, wherein said narrow section is designed so as to allow an efficient flow.

15. Blocking means according to claim 13, wherein said bolt defines a main discharge duct therein, said main discharge duct being open at a first end to atmosphere, said bolt further defining two partial discharge ducts connected with said main discharge duct, wherein said bolt is displaceable such tat at least one of said partial discharge ducts can be brought into fluid connection with each of said partial admission ducts.

16. Blocking means according to claim 13, wherein a flow cross-section in a transition region between said partial admission ducts and said partial discharge ducts is smaller than a flow cross-section of said partial admission ducts.

17. Blocking means according to claim 13, wherein said block means is arranged in a further housing, said her housing being attachable to said housing.

18. Blocking means according to claim 13, wherein said blocking means is a arranged in housing.

19. Blocking means according to claim 13, wherein said bolt is round in shape, and wherein said narrow section extends around an entire circumference of said bolt.

20. Blocking means according to claim 13, wherein said bolt defines a bypass duct on a side of said bolt facing said main admission duct, said bolt being moveable to produce a connection between said main admission duct and atmosphere.

21. Blocking means according to claim 20, wherein said bypass duct is arranged such that motion of said bolt can bring said main admission duct into fluid connection with both said narrow section and said bypass, and such that motion of said bolt can bring said main admission duct and said bypass duct into fluid connection without bringing said main admission duct and said narrow section into fluid connection.

22. Blocking means according to claim 13, wherein said bolt is rotatable around a longitudinal axis thereof.

\* \* \* \* \*

UNITED STATES PATENT AND TRADEMARK OFFICE
CERTIFICATE OF CORRECTION

| | |
|---|---|
| PATENT NO. | : 6,422,852 B1 |
| APPLICATION NO. | : 09/673058 |
| DATED | : July 23, 2002 |
| INVENTOR(S) | : Jan-Udo Kreyenborg et al. |

It is certified that error appears in the above-identified patent and that said Letters Patent is hereby corrected as shown below:

On the Title Page, item (22) should read as follows: PCT Filed: April 3, 1999

Signed and Sealed this
Twenty-third Day of October, 2012

David J. Kappos
*Director of the United States Patent and Trademark Office*